United States Patent [19]

Richards et al.

[11] Patent Number: 4,674,525

[45] Date of Patent: Jun. 23, 1987

[54] BREAKAWAY HOSE COUPLING DEVICE

[75] Inventors: Alton Richards, Roane County; Leonard R. Nitzberg, Knox County, both of Tenn.

[73] Assignee: Richards Industries, Inc., Rockwood, Tenn.

[21] Appl. No.: 766,834

[22] Filed: Aug. 16, 1985

[51] Int. Cl.⁴ ............................................. F16K 17/14
[52] U.S. Cl. ............................. 137/68.1; 137/543.17; 137/614.04
[58] Field of Search ............ 137/68.1, 543.17, 614.01, 137/614.04; 285/2, 3, 1

[56] References Cited

U.S. PATENT DOCUMENTS

| | | | |
|---|---|---|---|
| 1,551,697 | 9/1925 | Richardson | 137/543.17 X |
| 3,719,194 | 3/1973 | Anderson | 137/68.1 |
| 3,741,521 | 6/1973 | Tatsuno | 137/68.1 X |
| 3,788,348 | 1/1974 | Johnson | 137/614.04 X |
| 3,797,510 | 3/1974 | Torres | 137/68.1 |
| 4,023,584 | 5/1977 | Rogers | 137/68.1 |
| 4,449,545 | 5/1984 | Vernor | 137/68.1 |

*Primary Examiner*—Harold W. Weakley
*Attorney, Agent, or Firm*—Pitts and Brittian

[57] ABSTRACT

A breakaway hose coupling device (10) for releasably joining the hose ends of two fluid communicating hoses and for selectively disengaging and sealing such hose ends in response to disengaging force of a preselected value is disclosed. The coupling device (10) comprises a coupling sleeve (12) defining at least one shear pin hole (18) for receiving a shear pin (54) having a preselected shear strength. The coupling device (10) further comprises first and second valve assemblies (20 & 22) each comprising a valve housing (24, 25) having a forward end portion (26) for being received in the opposite ends of the coupling sleeve (12), and a rearward end portion defining a threaded receptor (34) for engaging a hose end. Each valve housing is also provided with a passageway (30) therethrough communicating with the hose end, the passageway (30) defining a forwardly disposed valve seat (32). Each of the valve assembly (20 & 22) further comprising a spring biased poppet valve (58) mounted within the passageway (30). The valve housing (24, 25) of one valve assembly (20, 22) is provided with an annular recess (52) registering with the shear pin hole (18) as the valve housing is received in the sleeve (12), whereby the shear pin (54) is received in the shear pin hole (18) and extends into a swivel ring member (52) rotatably mounted within the annular recess (52) thereby limiting the axial movement of said valve housing while allowing the valve housing to rotate within the coupling sleeve (12).

4 Claims, 3 Drawing Figures

4,674,525

BREAKAWAY HOSE COUPLING DEVICE

DESCRIPTION

1. Technical Field

The present invention relates to an improved breakaway hose coupling device for releasably joining the hose ends of two fluid communicating hoses. More specifically the coupling device is designed to disengage and seal such hose ends in response to disengaging force of a preselected value being exerted on the coupling device.

2. Background Art

Filling stations for dispensing gasoline and other fuels have long had a problem with vehicles pulling away from the fuel dispensing pump with the dispensing nozzle still inserted in the vehicle's tank, or with the nozzle or dispensing hose otherwise secured or hung on the vehicle. Such incidences usually result in damage to the dispensing pump and/or breakage of the dispensing hose. It will be appreciated that repairing the resulting damage to the dispensing pump and hose can be extremely costly. Further, the fuel spillage which can result from such damage can create a dangerous and possibly life threatening condition. Attempts have been made to overcome this problem by installing two hoses joined by a breakaway coupling device on the dispensing pump, with the coupling device designed to disengage and seal the hoses when pressure is exerted on the coupling as in the case where a vehicle pulls away from the pump with the nozzle or hose attached. Certain devices of this type are manufactured by Emco Wheaton, Inc., of Conneaut, Ohio and Husky Corporation of Pacific, Mo.

Therefore it is an object of the present invention to provide an improved breakaway hose coupling device for releasably joining the hose ends of two fluid communicating hoses.

Another object of the present invention is to provide an improved breakaway hose coupling device for selectively disengaging and sealing the hose ends of two hoses in response to disengaging force in excess of a preselected value being exerted on the coupling device.

Still another object of the present invention is to provide an improved breakaway hose coupling device which is less disruptive of fluid flow than conventional coupling devices.

A further object of the present invention is to provide an improved breakaway hose coupling device which is easy to install and is less susceptible to shear pin damage upon installation.

Another object of the present invention is to provide an improved breakaway hose coupling device which is inexpensive to manufacture and maintain.

DISCLOSURE OF THE INVENTION

Other objects and advantages will be accomplished by the present invention which provides a breakaway hose coupling device for releasably joining the hose ends of two fluid communicating hoses and for disengaging and sealing such hose ends in response to disengaging force of a preselected value. The coupling device comprises a coupling sleeve defining first and second oppositely disposed openings, and further defining at least one shear pin hole for receiving a shear pin having a preselected shear strength. The coupling device further comprises first and second valve assemblies each comprising a valve housing having a forward end portion for being received in one of the first and second openings of the coupling sleeve, and a rearward end portion defining a threaded receptor for engaging a hose end. Each valve housing is also provided with a passageway therethrough communicating with the hose end, the passageway defining a forwardly disposed valve seat. Further, the valve housing of one valve assembly is provided with an annular recess registering with the shear pin hole as the valve housing is received in the sleeve, whereby the shear pin is received in the shear pin hole and extends into a swivel ring member slidably mounted in the annular recess, thereby limiting the axial movement of said valve housing while allowing the valve housing to rotate within the coupling sleeve. Each of the first and second valve assemblies further comprising a spring biased poppet valve mounted within the passageway of the valve housing. Also, the poppet valves of each valve assembly define a forwardly disposed alignment pin receptor for releasably receiving an alignment pin.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 1:
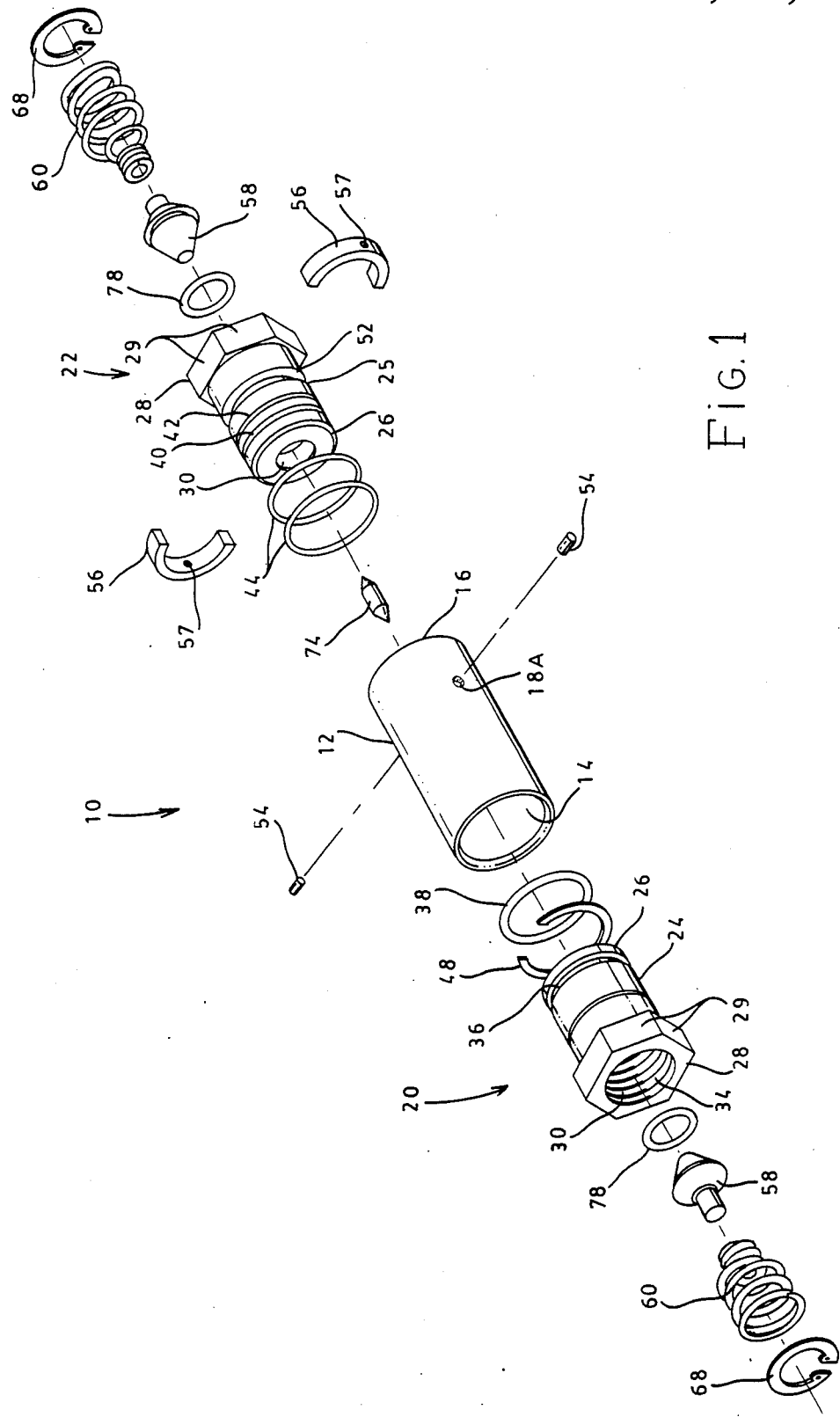
FIG. 1 is an exploded perspective view of the coupling device of the present invention.

A breakaway hose coupling device incorporating various features of the present invention is illustrated generally at 10 in the figures. The coupling device 10 is designed to accomplish the fluid impervious coupling of hose ends (not shown) of two fluid communicating hoses such as the hoses used in association with a fuel dispensing pump. The coupling device 10 is further designed to breakaway or disengage upon separation force in excess of a preselected value being applied against the coupling and to seal the disengaged hose ends. Whereas, the device 10 will be discussed at times herein in terms of joining fuel dispensing hoses, it will be appreciated that the device can be used to releasably join various types of hoses carrying various fluids.

The breakaway hose coupling device 10 comprises a cylindrical coupling sleeve 12 defining first and second oppositely disposed openings 14 and 16, respectively. The sleeve 12 further defines a pair of shear pin holes 18A and 18B the function of which will be discussed in detail below. The coupling device 10 further comprises first and second valve assemblies 20 and 22, respectively, for being releasably received on the hose ends to be joined. Since the valve assemblies 20 and 22 comprise various common components and features, for the purpose of the discussion which follows such common components and features will be identified by common reference numbers.

The first and second valve assemblies 20 and 22 comprise first and second valve housings 24 and 25, respectively, each of the housings 24 and 25 having a forward end portion 26 for being closely received in the sleeve 12 and a rearward end portion 28 provided with a hexagonal cross-section so as to define a plurality of wrench flats 29. Further, each of the valve housings 24 and 25 defines a passageway 30 extending axially therethrough, with the passageway 30 defining a forwardly disposed valve seat 32 and a threaded receptor 34 proximate the rearward end portion 28 of the valve housing 24, 25. The threaded receptors 34 serve as means for releasably securing the valve housings 24 and 25 on a hose end. However, it will be appreciated that the receptors 34 are illustrative of one preferred securing means for securing the housing 24 and 25 to hose ends having threaded coupling ends. Other suitable securing means can be substituted for the receptors 34 where the configuration of the hose end coupling requires.

Figure 2:
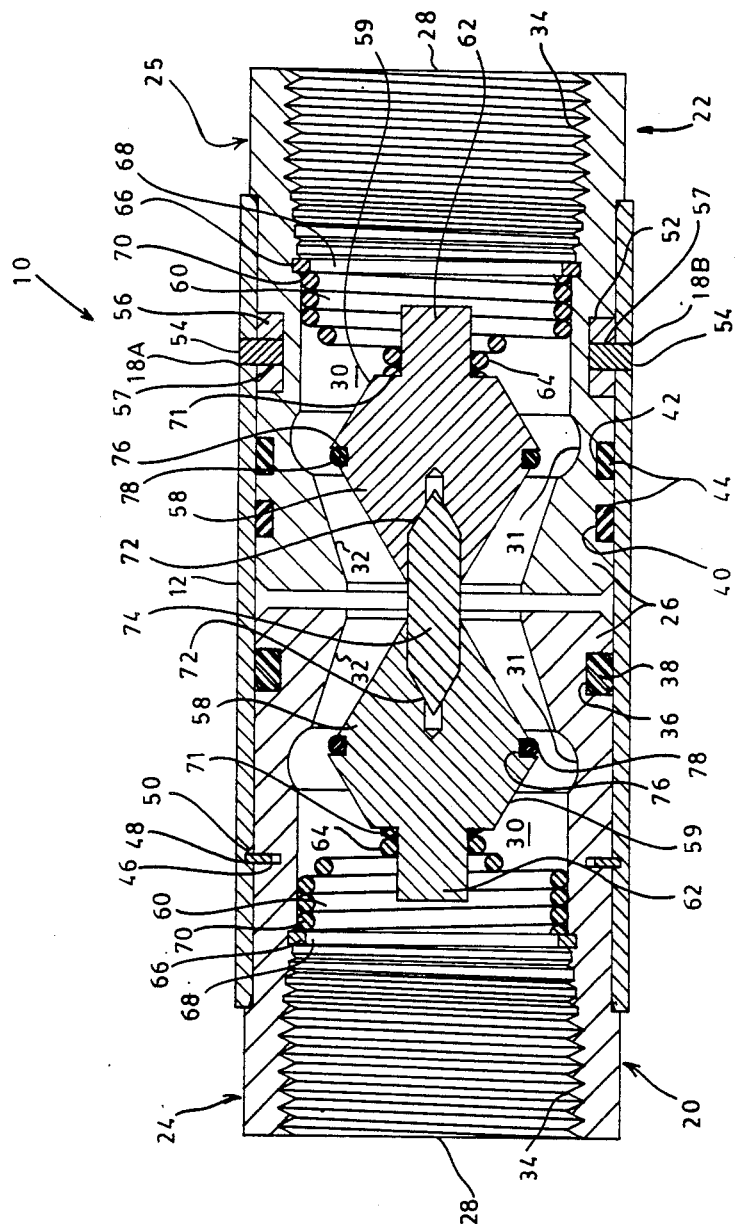
FIG. 2 is a side elevation view, in section, of the coupling device of the present invention.

As indicated above the forward end portions 26 of the valve housings 24 and 25 are closely received in the sleeve 12 as illustrated in FIG. 2. In order to ensure that a fluid impervious coupling is achieved each of the housings 24 and 25 is provided with suitable sealing means. More specifically, in the preferred embodiment the housing 24 is provided with an annular recess 36 for receiving an annular seal member 38. Similarly, the housing 25 is provided with first and second annular recesses 40 and 42, respectively, also receptive of annular seal members 44. Thus, it will be appreciated that the annular seal members 38 and 44 prohibit the fluid flowing through the passageways 30 from escaping between the valve housings 24 and 25 and the sleeve 12.

In order to secure the forward end portions 26 of the valve housings 24 and 25 in the sleeve 12 each of the housings 24 and 25 is provided with suitable securing means. In this regard, in the preferred embodiment housing 24 is provided with an annular recess 46 releasably receptive of a retaining ring 48. A further annular recess 50, registering with the recess 46, is provided in the interior wall of the sleeve 12. Accordingly, when the housing 24 is inserted in the sleeve 12 with the retaining ring 48 in the recess 46 the retaining ring 48 lodges in the further recess 50 thereby restricting the rearward axial movement of the housing 24.

With respect to the securing means for securing the housing 25, in the preferred embodiment the housing 25 is provided with an annular recess 52 which registers with the shear pin holes 18A and B and is rotatably receptive of a pair of swivel ring members 56. Each of the swivel ring members 56 is provided with a hole 57 receptive of a shear pin 54. Thus, as best illustrated in FIG. 2, with the swivel ring members 56 positioned in the annular recess 52 the shear pins 54 are received in the holes 18A and B of the sleeve 12 and in the holes 57 of the swivel ring members 56. It will be appreciated by those skilled in the art that with the shear pins 54 thusly positioned axial movement of the housing 25 within the sleeve 12 is restricted, but the housing 25 remains free to rotate within the sleeve 12. This ability of the housing 25 to rotate within the sleeve 12, or, differently stated, the ability of the sleeve 12 to rotate about the housing 25, helps prevent the shear pins 54 from being damaged by inadvertent twisting of the coupling device 10, particularly while the housing 25 is being installed on the associated hose end. In this regard, the tightening torque necessary for threadably securing the housing 25 on a hose end will normally exceed the shear strength of the shear pins 54, such that in the absence of such rotational ability the shear pins 54 could inadvertently be sheared as tightening torque is applied to the housing 25. However, whereas this rotation is desirable, it will be appreciated that excessive rotation of the housing 25 can result in chaffing and freezing of the swivel ring members 56 within the recess 52. Therefore, the housing 25 is provided with two seal members 44 which may be compressed so as to generate rotation restricting friction through contact with the sleeve 12. It will be understood that the seal members 44 serve not only to seal the device 10, but serve as braking means to prohibit excessive rotation of the housing 25 within the sleeve 12.

It will be understood by those skilled in the art that the shear pins 54 are designed to break or shear off when the total axial force to disengage reaches a preselected value, thus, allowing the housing 25 to slide from the sleeve 12 and the hoses to separate. Of course, shear pins 54 of various shear strengths can be used as desired. For example, where the coupling device 10 is uses to join fuel hoses used in association with a conventional fuel dispensing pump it is desirable to have the coupling device disengage when axial disengaging force exceeds approximately 150 pounds, but for other applications it may be desirable to have the coupling device 10 disengage at different disengaging force levels. It should also be noted that whereas in the preferred illustrated embodiment the means for securing the housing 24 in the sleeve 12 differs from the means provided for securing the housing 25 in the sleeve 12, another housing 25 with its associated securing means can be substituted for the housing 24 and the sleeve 12 modified to incorporate a further pair of shear pin holes 18A and B if desired. It will be understood, however, that only one of the valve housings needs to be capable of disengaging form the sleeve 12 in response to axial force of a preselected value for the device 10 to function.

As previously discussed, the coupling device 10 not only allows the hose ends which have been joined to disengage in response to axial disengaging force, but also automatically seals the hose ends such that the fluid carried by the two hoses is not allowed to escape. In order to accomplish the sealing of the hose ends a poppet valve 58 is axially mounted within the passageway 30 of each of the valve housings 24 and 25. Also provide are the spring members 60 which serve both as means for mounting the poppet valves 58 and as biasing means to bias the valves 58 toward the valve seats 32. More specifically, the poppet valves 58 are provided with rearwardly disposed mounting stems 62 which are closely received in the openings defined by the forward end portions 64 of the spring members 60. Further, the housings 24 and 25 are each provided with the annular recesses 66 which releasably receive the spring retaining rings 68. The rearward end portions 70 of the spring members 60 engage the retaining rings 68 such that the spring members 60 act against the stationary retaining rings 68 and biasing surfaces 71 of the valves 58 resulting in the forward biasing of the valves 58. Of course, it will be appreciated by those skilled in the art that the retaining rings 68 could be integrally formed with the housings 24 and 25. However, it will be noted that the removable retaining rings 68 allow the spring members 60 to be removed and replaced when worn or defective, and therefore represent the preferred embodiment of the invention.

As indicated above, the spring members 60 serve not only to bias the valves 58 toward the valve seats 32, but also as the mounting means for the valves 58. Because the spring members serve as mounting means, the configuration of the springs is of primary significance. Referring now to FIG. 2, it will be noted that the rearward end portion 70 of the spring member 60 defines a cylindrical helix configuration while the forward end portion 64 of the spring 60 defines a conical helix configuration of smaller diameter. It will be appreciated by those skilled in the art that the conical configuration of the forward end portion 64 results in the forward end portion 64 exhibiting a greater resistance to compression than the cylindrically configured rearward end portion 70. Thus, whereas the rearward end portion 70 serves to produce sufficient biasing force to seat the valve 58, it is the forward end portion 64 which provides the rigidity and increased compression rate necessary to maintain the proper axial positioning of the valves 58. In this regard, when the valves 58 are in the open position illustrated in FIG. 2, the rearward end portion 70, having the lesser compression rate, is essentially fully compressed. Therefore, the biasing force on the valves 58 is generated by the more tightly wrapped, higher compression, forward end portion 64. Resultantly, the valves 58, when in the open position are more rigidly held in position than would be the case with a conventional cylindrical spring, and the spring members 60 are able to maintain the desired positioning of the valves 58 even against the flow of fluid though the passageway 30.

It will be appreciated that using the spring members 60 as the means for mounting the valves 58 is much less disruptive of the flow of fluid through the passageway 30 than other conventional valve mounting means. It obviates the use of flow disruptive valve mounting structures commonly used in coupling devices, allowing the coupling device 10 to operate more efficiently.

As is best illustrated in FIG. 2, each of the poppet valves 58 defines a forwardly disposed alignment pin receptor 72 for receiving an end portion of the alignment pin 74. In this regard, when the housings 24 and 25 are in position within the sleeve 12 the opposite end portions of the alignment pin 74 are slidably received in the receptors 72, thereby further ensuring the axial alignment of the valves 58 and maintaining the the poppet valves 58 at a preselected axial distance from the associated valve seat 32 notwithstanding the forward biasing of the spring members 60. Thus, by maintaining the desired axial position of the valves 58 the alignment pin 74 ensures a uniform undisrupted flow of fluid through the coupling device 10 and ensures that when the coupling device disengages the poppet valves 58 will be in alignment to be properly seated in the valve seats 32.

It should be noted at this point that both the valves 58 and the passageway 30 of the device 10 have been designed to facilitate the unrestricted flow of fluid through the coupling device 10. In this regard the valves 58 define rearward portions 59 which are rearwardly tapered to reduce drag as fluid passes around the valves 58. Further, the passageways 30 define the expanded sections 31 which facilitate the unrestricted flow of fluid around the valves 58 as the valves 58 are in an open position.

Figure 3:
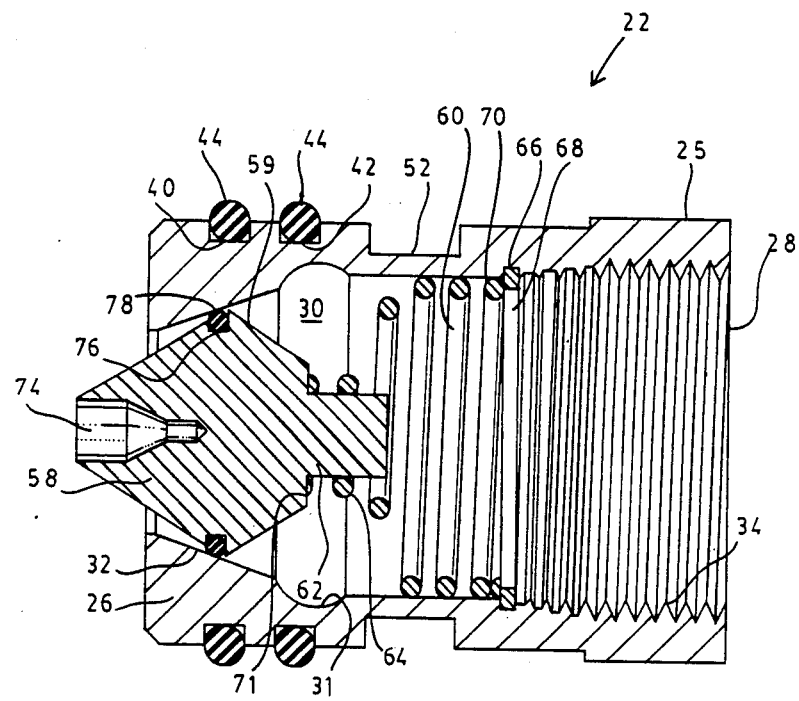
FIG. 3 is a side elevation view, in section, of a valve assembly of the coupling device of the present invention.

With respect to the operation of the poppet valves 58, when the housing 25 is pulled from the sleeve 12 the alignment pin 74 no longer serves to maintain the valves 58 in an open position and the spring members 60 bias the poppet valves 58 so as to engage the associated valve seat 32. In order to ensure a substantially fluid impervious seal between the valves 58 and the valve seats 32, each poppet valve 58 is provided with an annular groove 76 which releasably receives an annular seal member 78. As illustrated in FIG. 3, the seal 78 engages the valve seat 32 and forms a substantially fluid impervious seal between the valve 58 and the valve seat 32. Accordingly, as soon as the housing 25 is withdrawn from the sleeve 12 the poppet valves 58 of both valve assemblies 20 and 22 seal off the associated hose end avoiding loss of fluid from the hoses.

In the preferred embodiment of the coupling device 10 the housings 24 and 25, the spring members 60, the valve members 58 and the alignment pin 74 are all fabricated of a strong durable electrically conductive metal to ensure the electrical continuity of the coupling device 10. This electrical continuity is important, and in fact a statutory requirement, where the fluid directed through the coupling device is a flammable liquid and dangerous buildups of static electricity are to be avoided.

In light of the above discussion it will be appreciated that the coupling device 10 provides an improved breakaway coupling for joining two hose ends. The device 10 solves the problem of damage to a fuel dispensing pump as a result of excessive force being exerted on the associated dispensing hose. When used with a fuel dispensing pump the device 10 is mounted between a pair of hoses, one of which is secured to the dispensing pump. When force is exerted on the hoses which is sufficient to shear the shear pins 54 the coupling device 10 disengages to prevent damage to the pump and the valve assemblies 20 and 22 seal the hose ends such that dangerously flammable, and valuable, fuel does not spill from the hoses.

While a preferred embodiment has been shown and described, it will be understood that there is no intent to limit the invention to such disclosure, but rather it is intended to cover all modifications and alternate constructions falling within the spirit and scope of the invention as defined in the appended claims.

We claim:

1. An improved breakaway hose coupling device for releasably joining the hose ends of two fluid communicating hoses and for selectively disengaging such hose ends in response to disengaging force of a preselected value being exerted on such hoses and/or said coupling device, said coupling device comprising:

a coupling sleeve, said coupling sleeve defining first and second oppositely disposed openings, and further defining at least one shear pin hole;

first and second valve assemblies for being releasably secured on such hose ends, each said velve assembly comprising a valve housing having a forward end portion for being received in said first and second openings of said sleeve member and a rearward end portion provided with means for releasably engaging one such hose end, said velve housing being provided with a passageway therethrough communicating with such hose end, said passageway defining a forwardly disposed valve seat, each said first and second valve assembly further comprising a poppet valve mounted within said passageway of said valve housing, said poppet valve being provided with means for biasing said poppet valve toward said valve seat, one said valve housing being provided with a first exterior annular recess registering with said shear pin hole as said valve housing is received in said coupling sleeve;

at least one swivel ring member rotatably received in said first exterior annular recess, said at least one swivel ring member provided with a hole for registering with said at least one shear pin hole; and a shear pin closely received in said at least one shear pin hole and said hole of said at least one swivel ring member in said first exterior annular recess thereby limiting axial movement of said valve housing in said sleeve in the absence of such disengaging force in excess of such preselected value without limiting rotation of said valve assembly relative to said sleeve.

2. The improved breakaway hose coupling device of claim 1 wherein said coupling sleeve defines two shear pin holes, such hose coupling is provided with two shear pins, and said first exterior exterior annular recess is provided with a pair of swivel ring members for being rotatably received in said first annular recess, each said swivel ring member being provided with a hole receptive of one of said shear pins.

3. An improved breakaway hose coupling device for releasably joining the hose ends of two fluid communicating hoses and for selectively disengaging such hose ends in response to disengaging force of a preselected value being exerted on such hoses and/or said coupling device, said coupling device comprising:

a coupling sleeve, said coupling sleeve defining first and second oppositely disposed and axially oriented openings, and further defining a pair of shear pin holes oppositely disposed and aligned substantially perpendicular to the axis of said sleeve, said coupling sleeve being provided with a pair of shear pins having a preselected shear strengths for being received in said shear pin holes;

first and second valve assemblies for being releasably secured on such hose ends, each said valve assembly comprising a valve housing having a forward end portion for being received in said first and second openings of said sleeve member and rearward end portion provided with means for releasably engaging one such hose end, each said valve housing being provided with a passageway therethrough communicating with such hose end, said passageway defining a forwardly disposed valve seat, each said first and second valve assembly further comprising a poppet valve mounted within said passageway of said valve housing, each said poppet valve being provided with a spring member for biasing said poppet valve toward said valve seat, each said spring member being provided with a forward portion for engaging said poppet valve, said forward portion defining substantially a conical helix configuration, and a rearward portion defining substantially a cylindrical helix configuration, said poppet valves of each said first and second valve assembly defining a forwardly disposed and substantially axially aligned alignment pin receptor, said valve housing of said first valve assembly being provided with a first annular recess registering with said shear pin holes as said valve housing is received in said coupling sleeve, said first annular recess being rotatably receptive of a pair of swivel ring members, each said swivel ring member being provided with a hole for receiving one said shear pin, whereby said shear pins are received in said shear pin holes and in said holes of said swivel ring members thereby limiting the axial movement of said valve housing in the absence of such disengaging force in excess of a preselected value being exerted on said device while allowing axial rotation of said valve housing within said sleeve, the valve housing of said second valve assembly being provided with means for securing said valve housing within said coupling sleeve, each said valve housing also being provided with at least one further annular recess, said further annular recess being receptive of an annular seal member for establishing a substantially fluid impervious seal between said valve housings and said coupling sleeve, whereby such fluid is prohibited from escaping said coupling device between said valve housings and said coupling sleeve; and an alignment pin provided with opposite end portions for being received in said alignment pin receptors of said poppet valves, whereby said poppet valves are maintained in a preselected axial position as said valve housings are positioned within said coupling sleeve.

4. An improved breakaway hose coupling device for releasably joining the hose ends of two fluid communicating hoses and for selectively disengaging such hose ends in response to disengaging force of a preselected value being exerted on such hoses and/or said coupling device, said coupling device comprising:

a coupling sleeve, said coupling sleeve defining a wall and first and second oppositely disposed and axially oriented cylindrical openings, and further defining at least one shear pin through said wall;

first and second valve assemblies for being releasably secured on such hose ends, each said valve assembly comprising a valve housing having a forward end portion for being received in said first and second cylindrical openings of said sleeve member and a rearward end portion provided with means for releasably engaging one such hose end, said valve housing being provided with a passageway therethrough communicating with such hose end, said passageway defining a forwardly disposed valve seat, each said first and second valve assembly further comprising a poppet valve mounted within said passageway of said valve housing, said poppet valve being provided with means for biasing said poppet valve toward said valve seat, said poppet valves of each said first and second valve assembly defining a forwardly disposed and substantially axially aligned alignment pin receptor, said valve housing of one said valve assembly being provided with a first exterior annular recess registering with said shear pin hole as said valve housing is received in said coupling sleeve;

at least one swivel ring member for being rotatably secured in said first annular recess, said swivel ring member being provided with a hole for registry with said shear pin hole in said coupling sleeve;

a shear pin closely received in said shear pin hole and said hole in said swivel ring thereby limiting axial movement of said valve housing in the absence of such disengaging force in excess of such preselected value without limiting rotation of said valve assembly relative to said sleeve; and an axially aligned alignment pin extending between said poppet valves, said alignment pin provided with opposite end portions for being received in said alignment pin receptors of said poppet valves, whereby said poppet valves are maintained in a preselected axial open position as said valve housings are positioned within said coupling sleeve, and whereby said alignment pin disengages from both said poppet valves and said poppet valves close against said valve seats when such disengaging force exceeds such preselected value.

* * * * *